United States Patent [19]

Kuo et al.

[11] Patent Number: 5,416,187
[45] Date of Patent: May 16, 1995

[54] PROCESS FOR THE PREPARATION OF PHENOL-FUNCTIONAL POLYESTER RESINS

[75] Inventors: Thauming Kuo, Kingsport; Jeffery E. G. Powell, Blountville, both of Tenn.

[73] Assignee: Eastman Chemical Company, Kingsport, Tenn.

[21] Appl. No.: 223,412

[22] Filed: Apr. 4, 1994

[51] Int. Cl.⁶ ............................................. C08G 63/06
[52] U.S. Cl. .................................... 528/206; 528/176; 528/194; 528/195; 528/272; 528/275; 528/293; 528/298; 528/299; 528/300; 528/301; 528/302; 528/303; 528/306; 528/308; 528/308.6; 525/437; 525/444; 524/81
[58] Field of Search ............... 528/272, 275, 293, 298, 528/299, 300, 301, 302, 303, 306, 308, 308.6, 176, 194, 195, 206; 525/437, 444; 524/81

[56] References Cited

U.S. PATENT DOCUMENTS

| | | | |
|---|---|---|---|
| 3,127,376 | 3/1964 | Lindenauer et al. | 526/60 |
| 3,127,377 | 3/1964 | Lindenauer | 526/60 |
| 5,097,010 | 3/1992 | Markle et al. | 528/390 |
| 5,239,018 | 8/1993 | Yezrielev et al. | 525/418 |
| 5,245,002 | 9/1993 | Kuo | 528/176 |
| 5,256,756 | 10/1993 | Kuo | 528/176 |
| 5,256,757 | 10/1993 | Kuo | 528/176 |
| 5,256,758 | 10/1993 | Kuo | 528/176 |
| 5,256,759 | 10/1993 | Kuo | 528/176 |
| 5,326,831 | 7/1994 | Yezrielev et al. | 525/437 |

*Primary Examiner*—Samuel A. Acquah
*Attorney, Agent, or Firm*—Bernard J. Graves, Jr.; Harry J. Gwinnell

[57] ABSTRACT

This invention provides an improved process for preparing phenol-functional polyester resins which are useful in thermosetting coating compositions. The process involves a polycondensation reaction comprising a two-step charging procedure and suitable reaction conditions.

10 Claims, No Drawings

PROCESS FOR THE PREPARATION OF PHENOL-FUNCTIONAL POLYESTER RESINS

FIELD OF THE INVENTION

This invention belongs to the field of polyester chemistry. In particular, this invention provides an improved process for preparing phenol-functional polyester resins useful in coating compositions.

BACKGROUND OF THE INVENTION

Thermosetting coatings prepared from phenol-functional (PF) polyester resins and melamine-type crosslinkers have been shown to exhibit superior acid-etch resistance and a unique combination of hardness and flexibility. (See, for example, U.S. Pat. Nos. 5,245,002; 5,256,756; 5,256,757; 5,256,758; and 5,256,759). Accordingly, these coatings are especially useful as automotive coatings as well as coil coatings. Phenol-functional polyesters can also be used to react with isocyanates to form thermally-reversible polymers for hot-melt adhesive applications (see, for example, U.S. Pat. No. 5,097,010). Unlike conventional polyester resins, the PF resins are more difficult to prepare due to the presence of p-hydroxybenzoic acid (PHBA) as one of the critical components. Under ordinary reaction conditions, PHBA behaves as a mono-functional reactant since its phenol group does not react with the carboxyl groups. The resins thus require proper formulation to yield desired molecular weights. Moreover, PHBA is prone to decomposition and sublimation during the reaction, so it is especially challenging to produce clear, less colored resins. In this regard, U.S. Pat. No. 5,245,002 describes a staging technique wherein certain components are combined in an initial stage, followed by polycondensation and later addition of other components followed by completion of the polycondensation. Further, U.S. Pat. No. 5,239,018 notes that it is important to utilize p-hydroxybenzoic acid which is relatively free from basic contaminants and to control the reaction temperature so as to minimize decarboxylation and hence phenol formation.

By utilizing this prior methodology, satisfactory resins can be prepared on laboratory scales—i.e., up to about 2 kg. During scale-up of these processes however, we discovered that these processes frequently led to resins which exhibited an undesireable haziness (cloudiness). Accordingly, a ten-gallon reactor (Brighton/Trinity) was utilized for resin preparation, and the same processes as disclosed in the above references were followed. As will be shown below, the present invention provides a solution to this problem and thus provides a facile process amenable to large scale manufacture of phenol-functional polyester resins of high aesthetic quality.

SUMMARY OF THE INVENTION

This invention provides an improved process for manufacturing phenol-functional polyester resins having essentially no haziness. The process involves a polycondensation reaction comprising a two-step charging procedure and suitable reaction conditions which enable the facile removal of reaction product condensate during the second stage by utilizing an inert gas sparge. Resins thus prepared are commercially useful especially for automotive and coil coatings.

DETAILED DESCRIPTION OF THE INVENTION

Applicants have discovered unexpectedly that in order to produce clear, satisfactory, phenol-functional polyester resins on a large scale, a certain staging technique and a proper control of the reaction conditions need to be employed.

The present invention provides a two-step process for preparing phenol-functional polyester resins, said resins comprised of diol, triol, linear aliphatic diacid, aromatic hydroxy acid, and aromatic and/or cycloaliphatic dicarboxylic acid residues, which comprises the steps:

(I) reacting diols, triols, aromatic hydroxy acids, and about 40 to 75 weight percent of aromatic and/or cycloaliphatic dicarboxylic acids, based on the total weight of aromatic and/or cycloaliphatic dicarboxylic acids utilized, under polycondensation reaction conditions until at least about 90% of theoretical condensate has been recovered, followed by (II) reacting the product of step (I) with a linear aliphatic diacid and about 25 to 60 weight percent of aromatic and/or cycloaliphatic dicarboxylic acids, based on the total weight of aromatic and/or cycloaliphatic dicarboxylic acids utilized;

wherein in step (II), the removal of the final 15 to 30% of theoretical condensate reaction product is facilitated by sparging the reaction mixture with an inert gas at a rate of at least about 1.0 scfh (standard cubic feet per hour).

As used herein the phrase, "polycondensation reaction conditions" denotes commonly understood conditions of temperature and pressure necessary to effect the polymerization of diols, triols and diacids to form a polyester. Preferably, the temperature is from about 150° C. to about 220° C. and the pressure is at ambient pressure. Further, it is also preferred that an acid catalyst, such as butyl stannoic acid (e.g., FASCAT 4100, ATOCHEM) be utilized.

In the above process, examples of diols include ethylene glycol; propylene glycol; 1,3-propanediol; 2,4-dimethyl-2-ethylhexane-1,3-diol; 2,2-dimethyl-1,3propanediol; 2-ethyl-2-butyl-1,3-propanediol; 2-ethyl-2-isobutyl-1,3-propanediol; 1,3-butanediol; 1,4-butanediol; 1,5-pentanediol; 1,6-hexanediol; 2,2,4-trimethyl-1,3-pentanediol; thiodiethanol; 1,2-cyclohexanedimethanol; 1,3-cyclohexanedimethanol; 1,4-cyclohexanedimethanol; 2,2,4,4-tetramethyl-1,3-cyclobutanediol; p-xylylenediol; diethylene glycol, triethylene glycol; tetraethylene glycol; and pentaethylene, hexaethylene, heptaethylene, octaethylene, nonaethylene, and decaethylene glycols.

Preferred diols are selected from the following:

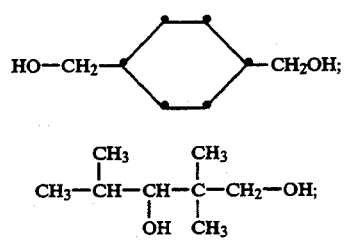

-continued

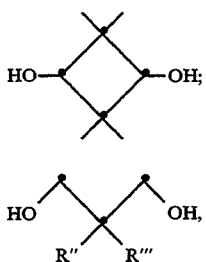

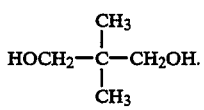

wherein R" and R"" are individually $C_1$-$C_8$ alkyl; and

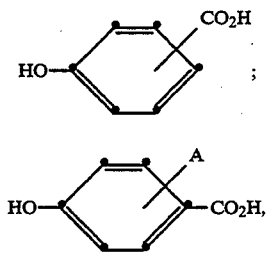

Examples of triols include trimethylolpropane, trimethylolethane, and glycerol.

In the above process, examples of aromatic hydroxy acids include the following:

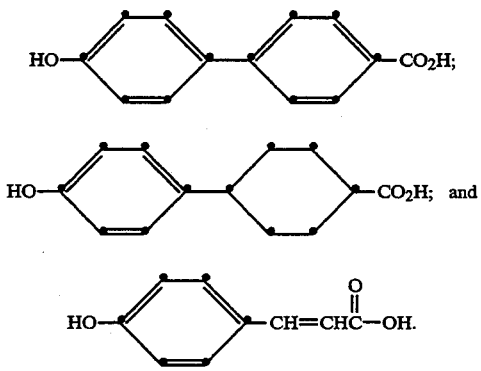

wherein A is halogen, $C_1$-$C_6$ alkyl, or phenyl;

An especially preferred aromatic hydroxy acid is p-hydroxy benzoic acid.

Examples of aromatic dicarboxylic acids include phthalic, terephthalic, isophthalic, 2,5-norbornanedicarboxylic, 1,4-naphthalic, diphenic, 4,4'-oxydibenzoic, 4,4'-oxydibenzoic, 4,4'-sulfonyldibenzoic, 4,4'-biphenyldicarboxylic, and 2,6-naphthalenedicarboxylic acids.

Examples of cycloaliphatic diacids include 1,2-, 1,3-, 1,4-cyclohexanedicarboxylic acid, and hexahydrophthalic anhydride. An especially preferred cycloaliphatic diacid is 1,4-cyclohexanedicarboxylic acid.

Examples of linear aliphatic diacids include dodecanedioic acid, azelaic acid, adipic acid, succinic acid, pimelic acid, sebacic acid, maleic acid, citric acid, itaconic acid, aconitic acid, suberic acid, oxalic acid, glutaric acid, malonic acid, dimethylmalonic acid, dimethylglutaric acid, fumaric acid, and trimethyl adipic acid.

In a preferred embodiment of the present invention, the following ranges of proportions of the various starting materials are utilized:
(a) about 20 to 45 mole percent of diols;
(b) about 4 to about 21 mole percent of triols;
(c) about 0 to about 30 mole percent of residues of linear aliphatic diacids;
(d) about 10 to about 40 mole percent of aromatic and/or cycloaliphatic dicarboxylic acids; and
(e) about 8 to about 30 mole percent of aromatic hydroxy acid residues;

wherein all mole percentages are based on the total moles of (a), (b), (c), (d), and (e), with the total being 100 percent.

In a further preferred embodiment of the present invention, the following ranges of proportions of the various starting materials are utilized:
(a) about 20 to 36 mole percent of diols;
(b) about 10 to about 21 mole percent of triols;
(c) about 5 to about 18 mole percent of residues of linear aliphatic diacids;
(d) about 25 to about 35 mole percent of aromatic dicarboxylic acids; and
(e) about 12 to about 20 mole percent of aromatic hydroxy acid residues;

wherein all mole percentages are based on the total moles of (a), (b), (c), (d), and (e), with the total being 100 percent.

In a further preferred embodiment of the present invention, the following ranges of proportions of the various starting materials are utilized:
(a) about 20 to 36 mole percent of diols;
(b) about 10 to about 21 mole percent of triols;
(c) about 10 to about 16 mole percent of linear aliphatic diacids;
(d) about 24 to about 40 mole percent of cycloaliphatic dicarboxylic acids; and
(e) about 12 to about 20 mole percent of aromatic hydroxy acid residues;

wherein all mole percentages are based on the total moles of (a), (b), (c), (d), and (e), with the total being 100 percent.

In a preferred embodiment of the present invention, the reactants for step (I) above, an acid catalyst, butyl stannoic acid (e.g., FASCAT 4100 (Atochem)), and a color stabilizer, WESTON 618F (G.E. Specialty Chemicals) are charged into a 10-gallon reactor equipped with steam-jacketed packed column and unpacked column, water-jacketed condenser, nitrogen sparge, and nitrogen blanket. Preferably, the initial nitrogen sparge and blanket rates are set at 0.4 scfh (standard cubic feet per hour) and the unpacked column is closed.

The reactants are preferably first heated to 150° C. to melt and stirred. The reaction temperature is then directly increased to 200° C. at a rate of about 2° C./min or sequentially increased to 160° C., 180° C., 200° C. and held until about 70% of the theoretical amount of the condensate for step (I) is collected. The temperature is subsequently increased to 220° C. and held until about 90% to 100% of the theoretical condensate is collected. After the completion of the first step, the reaction mixture is allowed to cool to 100° C.

In the second step, the reactants for step (II) are charged into the reactor, and the temperature is increased first to 180° C. and then to 220° C. As noted above, in the first step, about 40 to 75 weight percent of the total weight percent utilized of aromatic and/or cycloaliphatic dicarboxylic acids are utilized and in the second step the remaining amount of aromatic and/or cycloaliphatic dicarboxylic acids are added. When about 85% of the total theoretical amount of the condensate is removed, the unpacked column is opened and a nitrogen sparge rate is gradually increased to at least 1.0 scfh, preferably about 1.2–1.6 scfh in order to remove the condensate more effectively. In this regard, any gas which is inert under these reaction conditions will suffice. As noted above, this nitrogen sparge is utilized to facilitate the removal of the final 15–30% of the theoretical condensate reaction product, i.e., the theoretical based on the total of condensation reaction starting materials used. A vacuum can also be applied at the later stage of the reaction to help remove the condensate. The resin is allowed to process to the desired viscosity (e.g. 30–60 poises at 175° C.) as measured by an ICI Cone and Plate Viscometer or to the desired carboxylic-acid number (e.g. 0–30 mg KOH/g) as determined by a potentiometric titrator (Mitsubishi, GT-06).

In the above process, the sparge rate of the inert gas utilized will of course be affected by the reactor configuration, i.e., the size and shape of the reactor and the manner in which the inert gas is introduced into the reaction mixture, i.e., into the solution. The minimum sparge rate which is believed to be necessary to provide an advantageous effect on the aesthetic quality of the PF resins is 1.0 scfh.

As noted above, the phenol-functional polyesters of the process of the present invention are useful as coatings binders in thermosetting coating compositions. Methodology for formulating such compositions is well-known and detailed in U.S. Pat. Nos. 5,245,002; 5,256,756; 5,256,757; 5,256,758; and 5,256,759, incorporated herein by reference.

Experimental Section

EXAMPLE 1

Preparation of PF Resin Based on IPA and AD (PF-1)

Into a 10-gallon reactor (Brighton/Trinity) equipped with steam-jacketed packed and unpacked columns, water-jacketed condenser, nitrogen sparge, and nitrogen blanket were charged the following reactants: neopentyl glycol (NPG), 6347 g (60.9 mole); trimethylolpropane (TMP), 3972 g (29.6 mole); isophthalic acid (IPA), 5418 g (32.6 mole); p-hydroxybenzoic acid (PHBA), 4428 g (32.1 mole); the acid catalyst, FASCAT 4100, butyl stannoic acid 48 g; and a color stabilizer, WESTON 618F, 48 g. The nitrogen sparge and blanket rates were set at 0.4 scfh (standard cubic feet per hour) and the unpacked column was closed.

The reaction mixture was first heated to 150° C. to melt and stirred. The temperature was then increased to 200° C. at a rate of 2° C./min and held until 1226 g of the condensate (water) was collected. The temperature was subsequently increased to 220° C. and held until 1662 g of the condensate was collected. The reaction mixture was then allowed to cool to 100° C.

In the second step, IPA, 5418 g (32.6 mole), and adipic acid (AD), 2472 g (16.9 mole) were charged into the reactor, and the temperature was increased to 220° C. When 2900 g of the condensate was removed, the unpacked column was opened and the nitrogen sparge rate was gradually increased to 1.2 scfh. The resin was allowed to process until its ICI viscosity reached 39 poises at 175° C.; a total of 3455 g of the condensate was collected. The resultant resin was then allowed to cool to 160° C. and methyl n-amyl ketone (MAK, 10,500 g) added to yield a solution with about 70% solids.

EXAMPLE 2

Preparation of PF Resin Based on CHDA and AD (PF-2)

Into a 10-gallon reactor (Brighton/Trinity) equipped with steam-jacketed packed and unpacked columns, water-jacketed condenser, nitrogen sparge, and nitrogen blanket were charged the following reactants: NPG, 6347 g (60.9 mole); TMP, 3972 g (29.6 mole); 1,4-cyclohexanedicarboxylic acid (CHDA), 5609 g (32.6 mole); PHBA, 4428 g (32.1 mole); an acid catalyst, FASCAT 4100, butyl stannoic acid 48 g; and a color stabilizer, WESTON 618F, 48 g. The nitrogen sparge and blanket rates were set at 0.4 scfh (standard cubic feet per hour) and the unpacked column was closed.

The reaction mixture was first heated to 150° C. to melt and stirred. The temperature was then sequentially increased to 160° C., 180° C., 200° C., and 220° C. to collect the condensate of 506 g, 959 g, 1209 g, and 1522 g respectively. The reaction mixture was then allowed to cool to 100° C.

In the second step, CHDA 5609 g (32.6 mole) and AD 2472 g (16.9 mole) were charged into the reactor, and the temperature was first increased to 180° C. to collect 2415 g of the condensate and then increased to 220° C. When 2890 g of the condensate was removed, the unpacked column was opened and the nitrogen sparge rate was gradually increased to 1.6 scfh. The resin was allowed to process until its ICI viscosity reached 40 poises at 175° C.; a total of 3396 g of the condensate was collected. The resultant resin was then allowed to cool to 160° C. and MAK (10,500 g) added to yield a solution with about 70% solids.

EXAMPLE 3

Preparation of PF Resin Based on IPA and CHDA (PF-3.)

Into a 10-gallon reactor (Brighton/Trinity) equipped with steam-jacketed packed and unpacked columns, water-jacketed condenser, nitrogen sparge, and nitrogen blanket were charged the following reactants: NPG 6347 g (60.9 mole); TMP 3972 g (29.6 mole); IPA 6819 g (41.1 mole); PHBA 4428 g (32.1 mole); an acid catalyst, FASCAT 4100, butyl stannoic acid 48 g; and a color stabilizer, WESTON 618F, 48 g. The nitrogen sparge and blanket rates were set at 0.4 scfh (standard cubic feet per hour) and the unpacked column was closed.

The reaction mixture was first heated to 150° C. to melt and stirred. The temperature was then increased to 200° C. at a rate of 2° C./min and held until 1448 g of the condensate (water) was collected. The temperature was subsequently increased to 220° C. and held until 2005 g of the condensate was collected. The reaction mixture was then allowed to cool to 100° C.

In the second step, CHDA 7065 g (39.9 mole) was charged into the reactor, and the temperature was first increased to 180° C. to collect 2747 g of the condensate and then increased to 220° C. When 3050 g of the condensate was removed, the unpacked column was opened and the nitrogen sparge rate was gradually increased to 1.2 scfh. The resin was allowed to process until its ICI viscosity reached 51 poises at 175° C.; a total of 3385 g of the condensate was collected. The resultant resin was then allowed to cool to 160° C. and MAK (10,757 g) added to yield a solution with about 70% solids.

The properties of various resins are listed in Table I. Acid number and phenolic OH number were determined according to ASTM method D1639; the end points were determined by a potentiometric titration method. Molecular weights were estimated by gel permeation chromatography. Glass transition temperatures were recorded by a differential scanning calorimeter.

TABLE I

| Properties of Resins | | | |
|---|---|---|---|
| | PF-1 | PF-2 | PF-3 |
| Acid Number | 14 | 13 | 22 |
| Phenolic OH Number | 71 | 69 | 67 |
| Mn | 1868 | 1489 | 1468 |
| Mw | 62969 | 15498 | 39885 |
| Tg | 43 | 15 | 48 |

Mn: number average molecular weight
Mw: weight average molecular weight
Tg: glass transition temperature

We claim:

1. A two-step process for preparing phenol-functional polyester resins, said resins comprised of diol, triol, linear aliphatic diacid, aromatic hydroxy acid, and aromatic and/or cycloaliphatic dicarboxylic acid residues, which comprises the steps:
   (I) reacting diols, triols, aromatic hydroxy acids, and about 40 to 75 weight percent of aromatic and/or cycloaliphatic dicarboxylic acids, based on the total weight of aromatic and/or cycloaliphatic dicarboxylic acids utilized, under polycondensation reaction conditions until at least about 90% of theoretical condensate has been recovered, followed by
   (II) reacting the product of step (I) with a linear aliphatic diacid and about 25 to 60 weight percent of aromatic and/or cycloaliphatic dicarboxylic acids, based on the total weight of aromatic and/or cycloaliphatic dicarboxylic acids utilized;
wherein in step (II), the removal of the final 15–30% of theoretical condensate reaction product is facilitated by sparging the reaction mixture with an inert gas at a rate of at least about 1.0 scfh.

2. The process of claim 1, wherein the diol is selected from the group consisting of

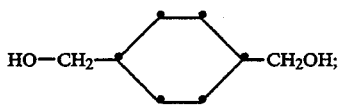

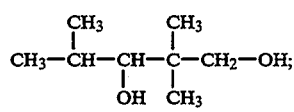

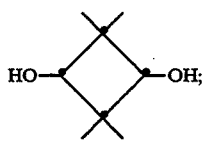

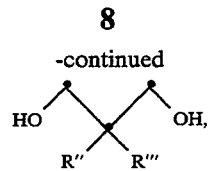

wherein R'' and R''' are individually $C_1$–$C_8$ alkyl; and $$HOCH_2-\underset{\underset{CH_3}{|}}{\overset{\overset{CH_3}{|}}{C}}-CH_2OH.$$

3. The process of claim 1, wherein the triol is selected from the group consisting of trimethylolpropane, trimethylolethane, and glycerol.

4. The process of claim 1, wherein the linear aliphatic diacid is selected from the group consisting of dodecanedioic acid, azelaic acid, adipic acid, succinic acid, pimelic acid, sebacic acid, maleic acid, citric acid, itaconic acid, aconitic acid, suberic acid, oxalic acid, glutaric acid, malonic acid, dimethylmalonic acid, dimethylglutaric acid, fumaric acid, and trimethyl adipic acid.

5. The process of claim 1, wherein the aromatic dicarboxylic acid is selected from the group consisting of phthalic, terephthalic, isophthalic, 2,5-norbornanedicarboxylic, 1,4-naphthalic, diphenic, 4,4'-oxydibenzoic, diglycolic, thiodipropionic, 4,4'-oxydibenzoic, diglycolic, thiodipropionic, 4,4'-sulfonyldibenzoic, 4,4'-biphenyldicarboxylic, and 2,6-naphthalenedicarboxylic acids.

6. The process of claim 1, wherein the cycloaliphatic dicarboxylic acid is cyclohexanedicarboxylic acid.

7. The process of claim 1, wherein the aromatic hydroxy acid is selected from the group consisting of

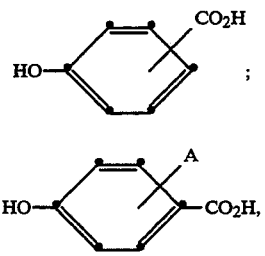

wherein A is halogen, $C_1$–$C_6$ alkyl, or phenyl;

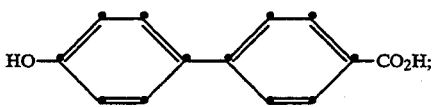

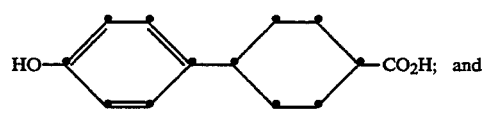

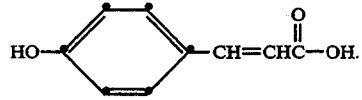

8. The process of claim 1, wherein the diol residues are comprised of a residue of the formula

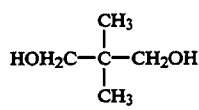

triols are comprised of trimethylolpropane;
linear aliphatic diacids are comprised of adipic acid;
aromatic diacids are comprised of isophthalic acid; and
the aromatic hydroxy acid is

9. The process of claim 1, wherein the diol residues are comprised of a residue of the formula

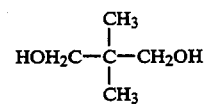

triols are comprised of trimethylolpropane;
linear aliphatic diacids are comprised of adipic acid;
cycloaliphatic diacids are comprised of 1,4-cyclohexanedicarboxylic acid; and
the aromatic hydroxy acid is

10. The process of claim 1, wherein the reactants in step (I) further comprise a color stabilizing agent and/or an acid catalyst.

* * * * *